Aug. 5, 1969  M. J. DE BLAUW  3,460,098
NON-SYNCHRONOUS DESIGN FOR DIGITAL DEVICE CONTROL
Filed March 15, 1967  14 Sheets-Sheet 1
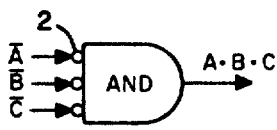
*Fig. 1a*
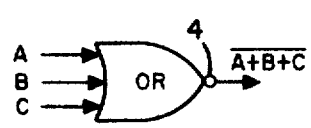
*Fig. 1b*
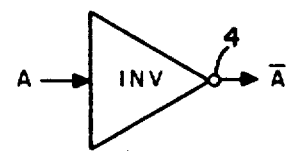
*Fig. 1c*
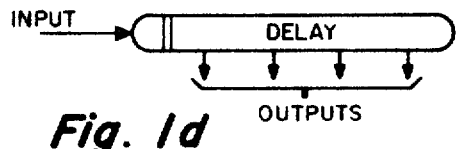
*Fig. 1d*
| A₁ | A₂ | A₃ | OUT |
|----|----|----|-----|
| L  | L  | L  | H   |
| L  | L  | H  | L   |
| L  | H  | L  | L   |
| L  | H  | H  | L   |
| H  | L  | L  | L   |
| H  | L  | H  | L   |
| H  | H  | L  | L   |
| H  | H  | H  | L   |
*Fig. 1e*
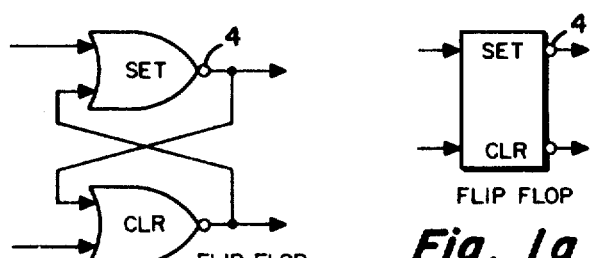
*Fig. 1f*
*Fig. 1g*
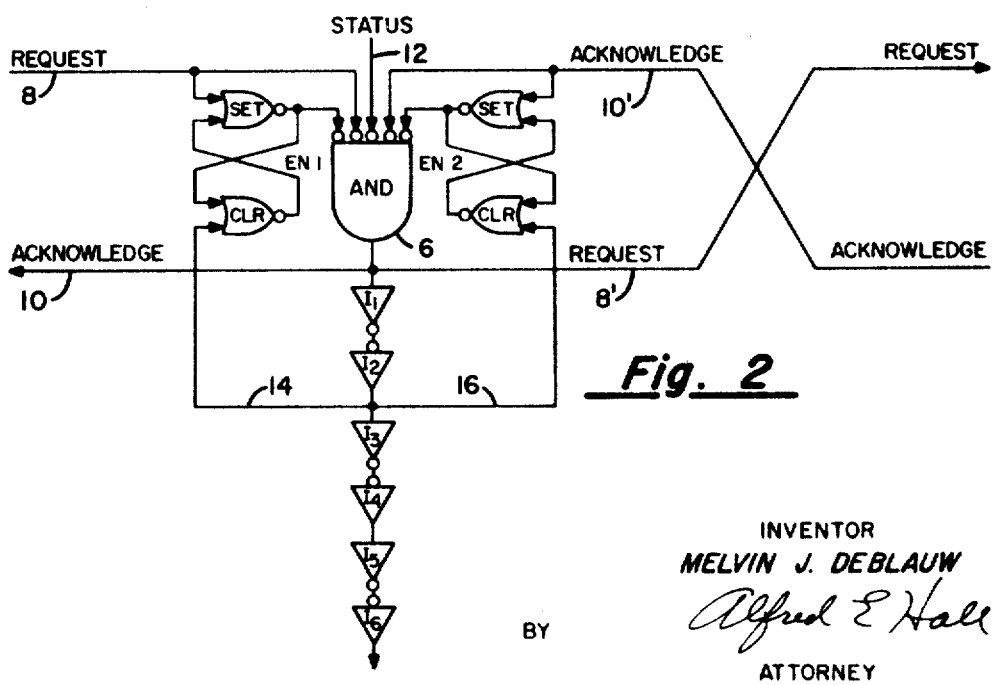
*Fig. 2*
INVENTOR
MELVIN J. DEBLAUW
Alfred E Hall
BY
ATTORNEY

United States Patent Office 3,460,098
Patented Aug. 5, 1969

3,460,098
NON-SYNCHRONOUS DESIGN FOR DIGITAL DEVICE CONTROL
Melvin J. De Blauw, Minneapolis, Minn., assignor to Sperry Rand Corporation, New York, N.Y., a corporation of Delaware
Filed Mar. 15, 1967, Ser. No. 623,338
Int. Cl. G06f 1/04
U.S. Cl. 340—172.5    9 Claims

ABSTRACT OF THE DISCLOSURE

A digital device that can be designed as a system of independently timed sub-units operating asynchronously with each other thereby eliminating the need for a master clock and the associated clock distribution problems.

---

The invention herein described was made in the course of or under a contract or subcontract thereunder, with the Department of the Army.

BACKGROUND OF THE INVENTION

Field of the invention

A digital computer or other digital device, upon receiving a given input signal, goes through an ordered sequence of steps resulting in a change in internal state and/or generating an output signal. To maintain proper order of the steps, time must be introduced. A major problem in designing digital devices is the introduction of this element of time.

Since the switching speed of basic logic elements such as transistors (even those of the same type) will vary and the interconnecting wire lengths will vary, the propagation speed of a signal through the device cannot be precisely determined at the time the device is being designed.

DESCRIPTION OF THE PRIOR ART

There are two prior art approaches that can be taken to compensate for this unknown propagation speed. The first is to force a fixed propagation delay with the use of a clock and the second is to design the logic of the device in such a way that variations in propagation delays can be tolerated.

The first solution is implemented by using a master clock and distributing these clock pulses to all circuits in the device, and in this way forcing a fixed propagation delay. The major problem here is in providing enough power to drive all the circuits in the device and drive them all in phase. Further, the clock pulses must provide a wide gate to compensate for the variable delays.

The second solution requires a large amount of additional logic. At any point in the device where two or more logic signals converge, three things must be known about the signal. It must be known whether a signal is present, and if so, whether it is a logical one or a logical zero. A considerable amount of additional circuitry is required to provide and use this "signal present" condition.

There are many solutions to the problem of timing that lie somewhere between these two extremes. The most common solution is to provide a master oscillator and distribute timing information to selected circuits throughout the device. This amounts to a compromise between the two extreme solutions which tends to be closer to solution one. The circuits are clocked every second, third or fourth level, or maybe even more, and enough time is allowed between clock phases to allow for the maximum propagation delay through the circuits between clocked points.

SUMMARY OF THE INVENTION

The present invention discloses apparatus for controlling the timing of a digital device in a manner close to the second solution mentioned above. Thus, it does not require a master oscillator or clock. Instead, the device is broken up into many individually timed sub-units and these sub-units communicate asynchronously with each other. This idea is analogous to a data processing system made up of computing units, memories and various input/output devices wherein each device in the system has its own internal timing but they are in physically separate cabinets and communcate asynchronously with each other through cables. The present invention extends this idea into the individual device.

The timing for each sub-unit is best derived by using the logic circuits themselves or by using lumped constant delay lines. The most desirable is to use the logic circuits for timing. The device can then be designed to allow a specific maximum ratio between maximum and minimum circuit propagation delay and can be constructed with circuits of any speed. There are several advantages to this type of timing scheme.

It eliminates the need for a master clock and all the problems involved in the clock distribution system.

It eliminates extra pin connections to the elements for inserting clock pulses.

Timing changes are much easier to implement. In a clocked system, when the clock phase on which a given step occurs is changed, the clock phase of all following steps may require changing. In this invention, a change in timing within a sub-unit does not affect the timing of any other sub-unit in the device.

The control logic design is greatly simplified because the system is broken up into many small independent sub-units.

Since the clock is eliminated and the control logic is simpler, the logic design of the device is much easier to implement with automated logic design methods.

There is no need to re-synchronize input signals from other devices with the internal clock.

Check-out of the device is much easier.

Each sub-unit of a device can be built as a separate removable module thereby simplifying maintenance procedures.

If sub-units are separately removable modules, this simplifies making changes in the system after it is built. In fact, a variety of standard sub-units may be used from which to build a variety of devices.

In view of recent advancements in integrated circuit technology, a sub-unit can be constructed as a single integrated circuit.

The system, when broken up into independent sub-units, lends itself very nicely to simulation techniques.

Thus, it is an object of the present invention to disclose apparatus for controlling the timing of a digital device without the use of a master oscillator or clock.

It is a further object of the present invention to provide a digital device that is broken up into many individually timed sub-units which communicate asynchronously with each other.

It is also an object of the present invention to provide a basic timing element which can be used in any individual sub-unit to cause it to communicate asynchronously with other sub-units.

BRIEF DESCRIPTION OF THE DRAWINGS

These and other more detailed and specific objects and features will be disclosed in the course of the following specification, reference being had to the accompanying drawings, in which:

FIGS. 1a–1g disclose the symbols used to represent the individual elements used in the present invention and includes a truth table to explain the AND and the OR gates;

FIG. 2 discloses the single basic timing element of the present invention around which a system may be built;

DESCRIPTION OF THE PREFERRED EMBODIMENTS

Symbology

Figure 3:
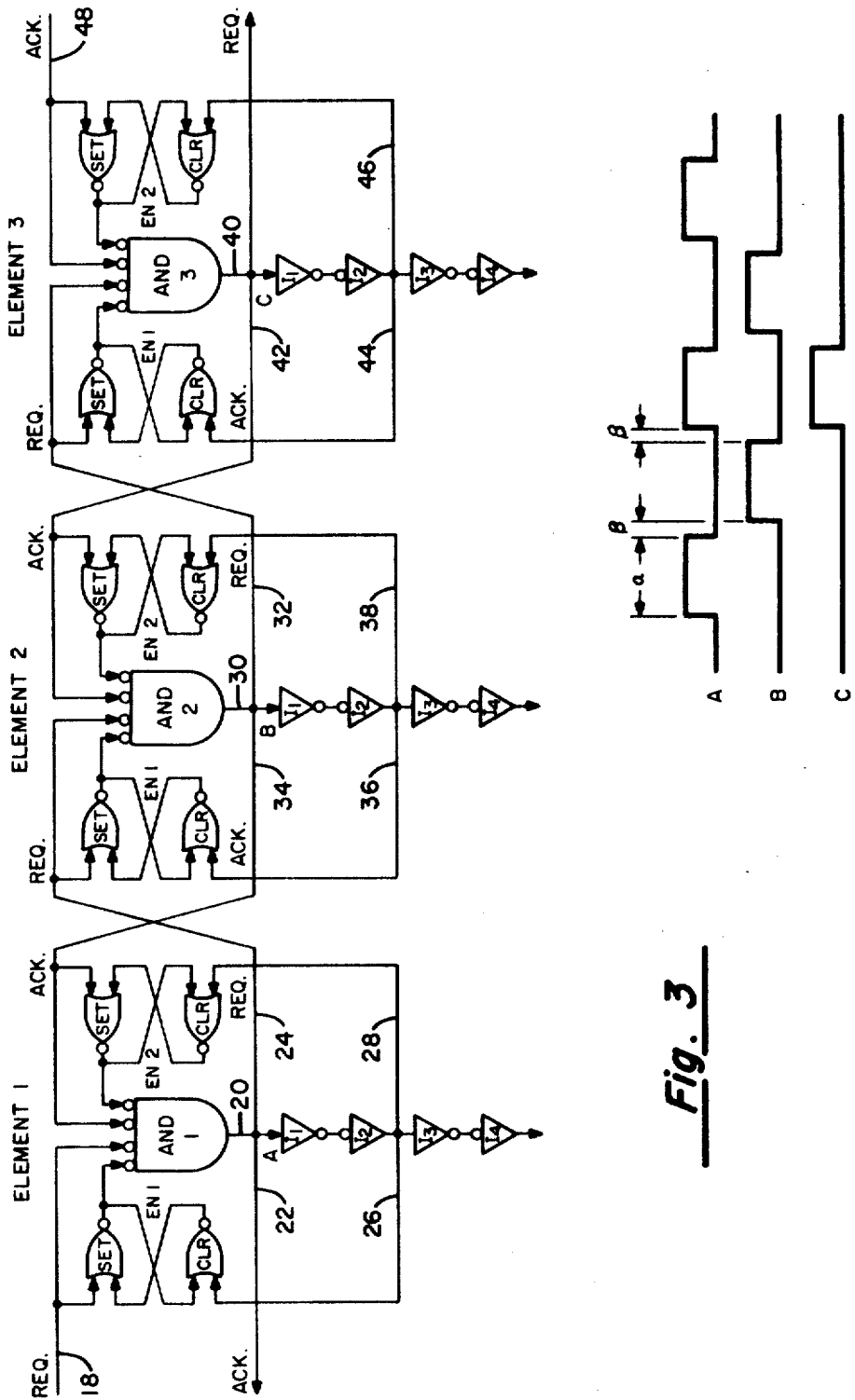
FIG. 3 shows three of the basic elements connected in series to receive and transmit control signals from one to the other asynchronously.

The symbols used are shown in FIGURES 1a–1g. NOR logic is assumed throughout the discussion; however, it is by no means a requirement. The AND and the OR are the same circuits. It is either a high OR (any input must be high) or a low AND (all inputs must be low) with a single inversion. See the truth table in FIG. 1c. Thus the small circle 2 on an input line represents a "low" input while a small circle 4 on the output line represents a "low" output. Flip-flops are generally shown as cross connected AND's and are well-known in the art. The "set" and "clear" conditions are defined for discussion purposes. The "set" condition is defined as a low output from the "set" side and a high output from the "clear" side. The "clear" condition is the reverse, i.e. a low output from the clear side and a high output from the set side.

The basic timing element

The system is built around a single basic timing element shown in FIGURE 2. Proper operation of the system is independent of actual circuit propagation delay, but it is dependent on the amount of variation in propagation delay. It is desirable to have a variation in propagation delay, maximum to minimum of no more than 2 to 1, including all the effects of fan-in, fan-out and wire length. Greater variation can be tolerated, but the scheme becomes somewhat more difficult to implement. Where delay is needed, it is most desirable to use logic circuits for this purpose rather than lumped constant delays. This permits the device to be designed to a specific ratio of maximum to minimum propagation delay, and to be implemented with circuits of any speed. The use of lumped constant delays has a disadvantage if it is necessary to provide special circuits to match the delay device to the logic circuits.

The basic timing element shown in FIGURE 2 consists of a first enable flip-flop EN1 which is a storage means for receiving and storing a request signal from a previous element indicating that data is available from the previous register, a second enable flip-flop EN2 which is a storage means for receiving and storing an acknowledge signal from the succeeding element which indicates that the succeeding register is ready to accept data, an AND gate 6 which has its input coupled to said first and second enable flip-flops and which produces an output signal enabling transfer of data from the preceding register to the succeeding register only when said first and second enable flip-flops have received and stored said request and acknowledge signals respectively, and a delay line. The delay line in this case is the chain of inverters $I_1$–$I_6$ but it can be a lumped constant delay line of the equivalent amount. On each side of the element there are two control lines 8, 8' and 10, 10' called "request" and "acknowledge" respectively. The use of the two control lines is explained in more detail when several of the elements are shown tied together. At the top of the figure is a "status" input on line 12. This can be any number (from 0 to $n$) of input lines which are the conditions that must exist before the element can become "active." The output signal to perform an operation can be taken from any point along the delay line.

When an input signal, represented by either the request or acknowledge signal, goes high, the associated enable flip-flop is set and, at the same time, AND gate 6 is held closed by the direct connection of the input signal to the AND gate. Holding AND gate 6 closed with the input signal insures that the element becomes active only after both enable flip-flops are set and both input signals have been removed (are low). The only requirement on the duration of the request or acknowledge pulse is that it be at least long enough to set its respective flip-flop EN1, or EN2. As previously pointed out, the input signals feed both the set side of the associated flip-flop and AND gate 6. When the input signal goes high, it *must* close AND gate 6 before the output of the set side of the respective flip-flop goes low for proper operation of the element.

AND gate 6 is activated and its output goes high when both enable flip-flops EN1 and EN2 are set and both input lines 8 and 10' are returned to the low condition provided the status line 12 (if any) is also in the low condition. The high output of AND gate 6 is coupled to the preceding element via line 10 as an acknowledge signal and to the succeeding element via line 8' as a request signal and also continues to propagate through the chain of inverters used as a delay time. At some point along the delay line, this high output is tapped off by lines 14 and 16 and is used to clear both enable flip-flops EN1 and EN2. When either flip-flop EN1 or EN2 clears, AND gate 6 closes and its output goes low. This low output propagates through the chain of inverters used as a delay line. The resultant output of AND gate 6 is a single pulse whose width is determined by the point along the delay line at which either of the enable flip-flops EN1 and EN2 are cleared. At the time the enable flip-flops are cleared, they are enabled to receive subsequent request and acknowledge signals.

Series connection of elements

Three of the timing elements are shown connected together in FIGURE 3. Any number of them may be connected together in this way and the amount of delay in each element can be different. To establish a starting point for the explanation of how the elements operate, assume that all enable 1 flip-flops (EN1) are clear or reset, all enable 2 flip-flops (EN2) are set, and all request and acknowledge lines are low. When the request line 18 into element 1 goes high, it holds AND gate 1 closed and sets flip-flop EN1. When request line 18 returns low, AND gate 1 is activated and its output on line 20 goes high.

The output of AND gate 1 provides the acknowledge input to the preceding element on the left on line 22 and the request input on line 24 to the succeeding element on the right. The signal to the right on line 24 holds AND gate 2 closed while setting flip-flop EN1 of element 2. Further down the chain of inverters $I_1$–$I_4$ forming the delay line of element 1, the high output is tapped off with lines 26 and 28 and used to clear flip-flops EN1 and EN2 respectively of element 1. When either of the two flip-flops clear, AND gate 1 closes and its output on line 20 goes low. Now, this low output from AND gate 1 activates AND gate 2 in element 2 since both flip-flops EN1 and EN2 of element 2 are set. The output of AND gate 2 on line 30 goes high which provides a request to the succeeding element on the right on line 32 and an acknowledge to the preceding element on the left on line 34. The signal on line 32 sets the EN1 flip-flop of element 3 and the signal on line 34 set the EN2 flip-flop of element 1 and at the same time holds both AND gates 1 and 3 closed because it is high. Again, this high signal is tapped off the delay line on lines 36 and 38 which clears flip-flops EN1 and EN2 respectively of element 2. When either of the enable flip-flops of element 2 clear, AND gate 2 closes and its output on line 30 goes low. This low output activates AND gate 3 via line 32, but not AND gate 1 because EN1 of element 1 has been previously cleared. Timing element 3 then cycles by producing a high output on line 40 which sets (acknowledges) flip-flop EN2 of element 2 via lines 42 and also clears its own enable flip-flops EN1 and EN2 via lines 44 and 46 respectively. Now flip-flop EN2 of both elements 1 and 2 are set and both enable flip-flops EN1 and EN2 of element 3 are clear. Perhaps, to provide a clearer picture of how an element operates, the operation of a timing element can be made analogous to the activity of a man in a bucket brigade. Assume a line of men passing buckets from left to right. The following table presents an analogy between the activity of one of the men in this bucket brigade and the operation of a timing element.

| The man | The element |
|---|---|
| Man is facing left ready to take a bucket when handed one. | Element EN1 is clear and EN2 is set. |
| A bucket is handed to him. | EN1 of the element is set. |
| Man takes the bucket and hands it to the man on his right. | The element becomes active, acknowledges the requesting element (i.e., taking the bucket), requests the next element (i.e., hands the bucket to the next man) and clears both enable flip-flops. |
| The man to his right takes the bucket and then turns back to the left. | EN2 of the element is set by an acknowledge (i.e., the bucket is taken). |

It is possible that while this man is handing the bucket to the man on his right, the man on his left already is handing him another bucket. This would be analogous to the situation in a particular timing element where EN1 of that element is set and EN2 of that element is clear. That is, the element to the right has not acknowledged but the element to the left has already requested.

Let us consider the three timing elements of FIGURE 3 to be three men in a bucket brigade. Then, so far in the discussion of the elements, the situation is as though the first man were handed a bucket, he handed it to the second man and the second man in turn handed it to the third man who still has it. Man number 3 is handing the bucket to the man on his right but it is not being taken. In the previous discussion of the three elements, this is analogous to the present situation in element 3. Element 3 cycled and sent a request to the element on its right but has not received an acknowledge.

Now, let us return to the discussion of the three elements. Another input pulse on request line 18 to element 1 will set flip-flop EN1 and element 1 will cycle again (when the request signal goes low). Its output signal on line 20 will set EN1 of element 2. Element 2 cycles again and sets EN1 of element 3 and EN2 of element 1. Element 3 will not cycle because EN2 of that element is not set. Now element 1 has only EN2 set, element 2 has neither enable flip-flop set, and element 3 has only EN1 set. If EN1 of element 1 is again set, element 1 cycles setting EN1 of element 2. Element 2 will not cycle. Now both flip-flops of element 1 are cleared by the output of AND gate 1 on line 20. If again EN1 of element 1 is set, element 1 will not cycle. Now EN1 of each element is set and EN2 of each element is clear. This is the opposite from the starting condition.

The present condition of the timing elements is analogous to a situation where all three men are handing a bucket to the man on the right, and a bucket also is being handed to the first man in line (i.e., element 1).

Assume now that a high input (an acknowledge) on line 48 sets EN2 of element 3. When the high input on line 48 goes low, element 3 cycles and produces a high out on line 40 which sets EN2 of element 2 and clears its own enable flip-flops via lines 44 and 46. Element 2 then cycles and produces an output on line 30 which sets EN2 of element 1 and EN1 of element 3 and clears enable flip-flops EN1 and EN2 of element 2 via lines 36 and 38 respectively. Element 1 then cycles and produces a high output on line 20 which sets EN1 of element 2 and clears its own enable flip-flops via lines 26 and 28. Assume that EN2 of element 3 is set again with a signal on line 48. Element 3 cycles, then element 2 cycles, but element 1 will not cycle because its EN1 flip-flop is not set. If EN2 of element 3 is set again, element 3 cycles setting EN2 of element 2 and clearing its own enable flip-flops. Now element 2 will not cycle because its EN1 flip-flop is clear. If EN2 of element 3 is set again it will not cycle.

Once again returning to the three man bucket brigade analogy, what has happened now with the elements is analogous to someone taking the buckets from man number three, but no more buckets are handed to man number one. Someone takes the first bucket from man number three, man three in turn takes the bucket from man two, man two takes the bucket from man one, and man one is prepared to take a bucket when handed to him. Again someone takes a bucket from man number three and the process continues until none of the men are holding any buckets.

It is possible to have more than one element cycling simultaneously. Assume a starting condition with all EN2 flip-flops set. If EN1 of eleemnt 1 is set, element 1 cycles setting EN1 of element 2; element 2 then cycles setting EN2 of element 1 and EN1 of element 3. If EN1 of element 1 is set while element 2 is cycling, elements 1 and 3 now cycle simultaneously. This sets both enable flip-flops of element 2 and, when both elements 1 and 3 stop cycling, element 2 cycles. In a long string of elements it is possible to have alternate elements cycle simultaneously.

The bucket brigade analogy can be used to visualize how the elements operate simultaneously. If all the men in a bucket brigade are working in unison, every other man is "active." That is, he is currently passing a bucket.

Any number of these timing elements can be connected together in a string. In the example of FIGURE 3, three sequential elements from the middle of a string of $n$ elements are shown. Of course, there must be a beginning and an end. The first element has no EN1 flip-flop since a low input signal to the AND gate will begin the cycle and the last element has no EN2 flip-flop since it has nothing to drive.

Obviously the signal that drives adjacent elements can be taken from different points along the delay line thus affecting the time relationship between pulses. Inverters are used for the delay and as shown in the waveforms associated with FIGURE 3, the pulse widths, $\alpha$ and spacing, $\beta$, are expressed in terms of an average inverter delay, $d$, and a maximum variation, $\Delta d$, from the average where:

$$d = \frac{\text{maximum delay} + \text{minimum delay}}{2}$$

$$\Delta d = \frac{\text{maximum delay} - \text{minimum delay}}{2}$$

The pulse width, $\alpha$, is determined by the number of inverters in the path used to clear the EN1 and EN2 flip-flops of any element. The minimum time, $\beta$, between any two adjacent pulses produced by adjacent elements is the delay through the appropriate AND gate. The maximum time between the pulses from AND gates in adjacent elements is a function of when the enable flip-flops in the first element are set and when the "status" inputs (if used) go low or when the output from the AND gate in the first element goes low.

Figure 4:
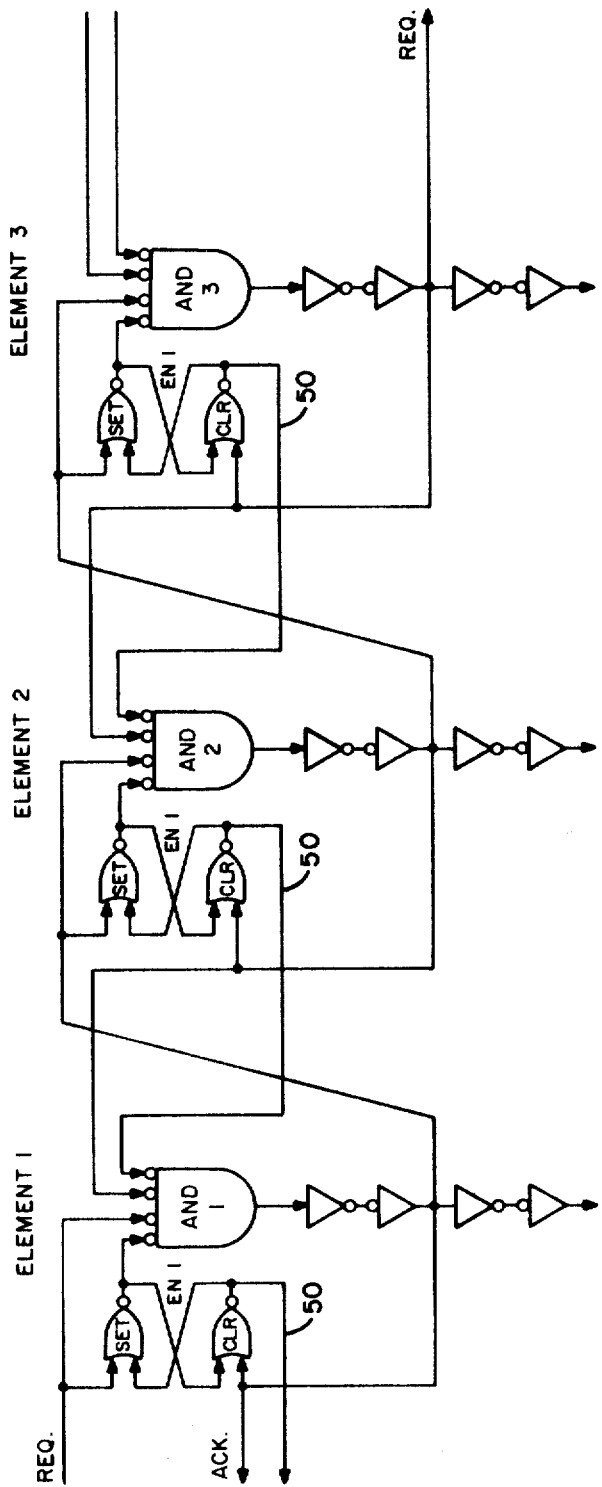
FIG. 4 discloses how the basic timing element may be simplified under certain timing conditions.

The tap on the delay line that clears or resets the enable flip-flops of an element may also be the tap used to transmit the request and acknowledge signals to the adjacent two elements. If this configuration is used, one enable flip-flop of each element is redundant and can be eliminated. The result is shown in FIGURE 4. The first output (the set side) of EN1 goes directly to the input of the AND gate of its own element. The second output (the clear side) of EN1 of each element on line 50, previously not used, goes to the input of the AND gate in the preceding element for preventing it from producing an output until it is properly acknowledged. One flip-flop serves the purposes of both flip-flops in FIGURE 3 because EN1 of a given element and EN2 of the preceding element would always switch simultaneously anyway if the signal from the tap on the delay that is used as the request and acknowledge signals were also used to clear or reset the enable flip-flops of the given element. Thus, the AND gate of the $n^{th}$ element has as inputs the request signal from the $n^{th} - 1$ element as an inhibit signal, an acknowledge signal from the output of the $n^{th} + 1$ element as an inhibit signal, said second output from said $n^{th} + 1$ element storage means as an inhibit signal until said acknowledge signal is produced and the first output of said $n^{th}$ element storage means as an enable signal whereby an output signal from said AND gate is produced only when said request and acknowledge signals are dropped.

Alternate interconnection possibilities

Figure 5:
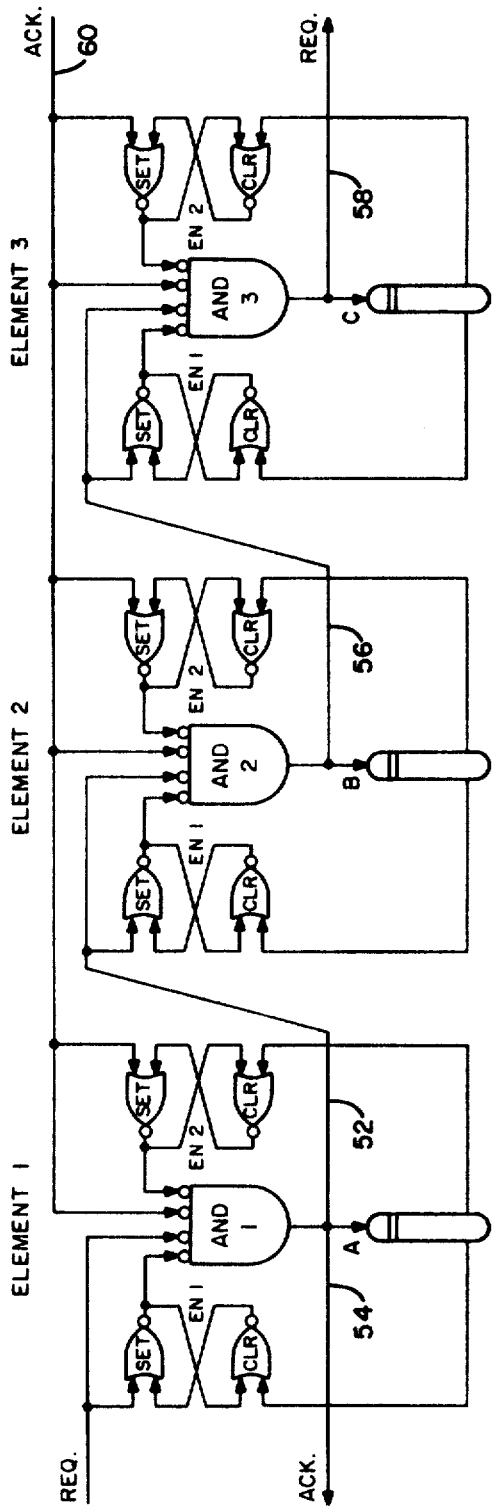
FIG. 5 discloses how the basic timing element may be used to provide sequential output pulses.
Figure 5:
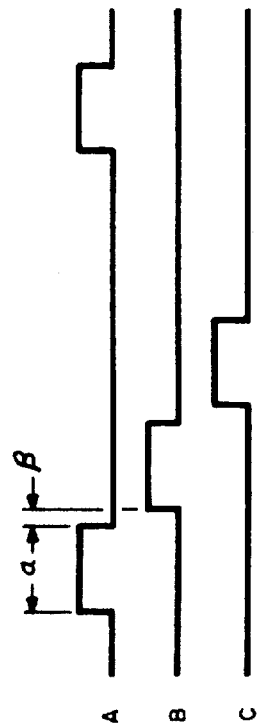

So far in this discussion the timing elements are interconnected such that alternate elements can cycle simultaneously. In this case, each element is connected only to adjacent elements. As shown in FIGURE 5, this does not have to be the case. In FIGURE 5, element 1 provides a request to the succeeding element on the right on line 52 and an acknowledge to the preceding element on the left on line 54. Element 2 has an output to element 3 on line 56 but not to element 1. Element 3 has an output to the right on line 58 but not to the left to element 2. The acknowledge from the right on line 60 sets EN2 of elements 1, 2 and 3. The result here (assuming the starting condition of all EN2 flip-flops as set) is that when EN1 of element 1 sets, element 1 cycles, the element 2 cycles and then element 3 cycles. Element 1 cannot recycle until the acknowledge from the right on line 60 sets the EN2 flip-flop of all elements. This results in a sequence of pulses A, B, and C which always occur in that order. The sequence is always completed before a new sequence starts.

How the elements are used

Figure 6:
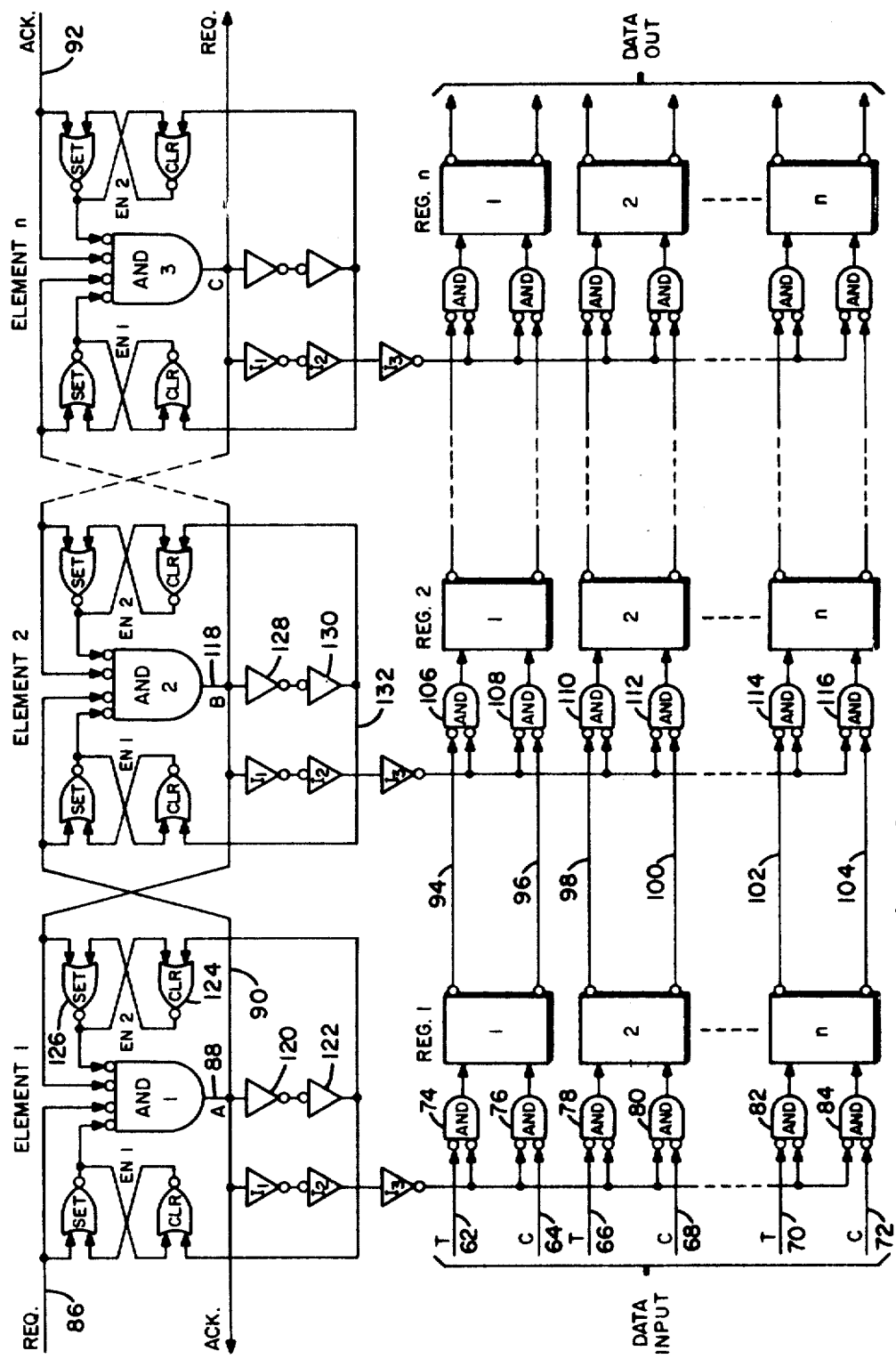
FIG. 6 discloses how the basic timing element may be used to control the transfer of data from register to register.

In order to see how these timing elements are used to perform a useful operation, consider the system of FIGURE 6. This is a three register information buffer. Associated with each register is a basic timing element. The interconnection of the timing elements is the same as in FIGURE 3, also the relationship between pulses A, B and C is the same. Only three of $n$ stages are shown in each of the $n$ registers for purposes of illustration. The true and complement of each input data bit is available and one or the other is stored in its associated stage. Three inverters $I_1$, $I_2$ and $I_3$ are shown driving each of the associated register AND gates. It is assumed that three levels are necessary to build up the fan-out to drive all the AND's.

Assume that initially all EN1 flip-flops are cleared, and all EN2 flip-flops are set. This is the condition that exists when there is no information in the buffer. Assume now that there is data available on the data input lines 62–72 to the AND gates 74–84 of register 1, that EN1 of element 1 is set and that the request line 86 goes low. Element 1 cycles causing AND gate 1 to produce a high output on line 88 which gates the data on the input lines into the stages of register 1 and sets EN1 of element 2 via line 90. Element 2 cycles in the same manner followed by the cycling of element $n$. The data is now in the stages of register $n$, and both enable flip-flops of element $n$ are clear. Element $n$ will not cycle again until both of its enable flip-flops are set. EN1 of element $n$ is set if element 2 cycles again, placing a new data word in register 2. EN2 of element $n$ is set by an acknowledge signal on line 92 from the following timing element, when this element takes the data that is available at the output of the stages of register $n$.

If a new data word is available to register 1 and EN1 of element 1 sets, element 1 cycles again, gating the data into register 1. Then, element 2 cycles, gating the data into register 2 and setting EN1 of element $n$. If EN2 of element $n$ is still clear, the first data word is still in register $n$ and element $n$ will not cycle. If a third word is now available only element 1 cycles and the data stops at register 1. Now all registers are full. Using the bucket brigade analogy again, the data in this case represents the "bucket."

To unload the buffer, a timing element must gate the data out of register $n$ and set EN2 of element $n$. This is accomplished by a signal on line 92 which results in moving the data to the right by one register. Element $n$ cycles first, gating the contents of register 2 into register $n$. Then, element 2 cycles, gating the contents of register 1 into register 2, etc. Each time a data word is taken out on the right side, all data shifts to the right by one register. This continues until the buffer is empty, unless more data words are gated in from the left.

Some timing considerations

There are two timing situations that should be considered at this point relative to the system of FIGURE 6:

(1) The time at which new data arrives at the gates of a register relative to when the gates open.
(2) The time at which the data changes again relative to when the gate closes.

Data should be available at the gates before they open and must not change until after they close. In a double gated situation, the data could arrive after the gates open, but the absolute requirement is that the data be available at the gates simultaneously with the gating signal long enough to allow the flip-flops to latch.

Again referring to FIGURE 6, assume that there is data available on the data input lines 62–72 and that EN1 of element 1 sets. AND gate 1 is now activated and its output on line 88 goes high. This high output, after being inverted three times by inverters $I_1$–$I_3$, is a low input to the AND gates 74–84 of register 1. The data is then gated into register 1 and, after going through the AND gates and the flip-flops, is available at the output of the stages of register 1 on lines 94–104 and therefore is present at the gates 106–116 of register 2. The path from the output of AND gate 1 to the output of the stages of register 1 involves a series of five circuits or delays. They are the three inverters, $I_1$–$I_3$, the register gates 74–84 and the register stages themselves. The maximum time from the time the output of AND gate 1 (pulse A) on line 88 goes high until the data is available at the gates 106–116 of register 2 is $5d_{max}$ where $d$ is one delay period. The earliest that the register 2 gates can open, relative to the leading edge of pulse A, is the minimum time between the leading edge of pulse A on line 88 and the leading edge of pulse B on line 118 from AND gate 2 plus the minimum time for pulse B on line 118 to get through the inverters $I_1$–$I_3$ from the output of AND gate 2 to the gates 106–116 of register 2. The minimum time between the leading edge of pulse A and the leading edge of pulse B is $6d_{min}$ and the path includes inverters 120 and 122 in element 1, clear gate 124 and set gate 126 in element 1, AND gate 1 in element 1 and AND gate 2 in element 2. The minimum time for pulse B to get through inverters $I_1$–$I_3$ in element 2 is $3d_{min}$. Thus, the total minimum time is $9d_{min}$. In order to insure that the data on lines 94–104 arrived at the gates of register 2 before the gating pulse on line 128, the maximum propagation delay of the first path (5 inverters) must be equal to or less than the minimum propagation delay of the second path (9 inverters). This means that in this example $5d_{max}$ must be $\leq 9d_{min}$, or $$\frac{5d_{max.}}{9d_{min.}} \leq 1$$

and $$\frac{d_{max.}}{d_{min.}} \leq \frac{9}{5}$$

Therefore, if the ratio of maximum to minimum propagation delay is greater than 9/5, delay can be added between pulse A and pulse B by taking the request signal on line 90 that sets flip-flop EN1 of element 2 from a later point along the delay line of element 1 formed by inverters 120 and 122.

The other important timing situation that must be considered is the relationship between the time the gates 106–116 of register 2 close and the time at which new data is available on lines 94–104 from register 1. Again, two paths are involved, starting at the output of AND gate 2 when the signal at this point goes low (the trailing edge of pulse B). This low output, after three inverters $I_1$–$I_3$, is a high input at the gates 106–116 of register 2 which closes these gates. Then, the latest the gates can close is $3d_{max}$ from the time the output of AND gate 2 on line 118 goes low. The other path is through the delay line of element 2 (two inverters 128 and 130) through AND gate 1 via line 132 (if EN1 is set and the input request line 86 is low), through the three inverters $I_1$–$I_3$ to the gates 74–84 of register 1, through the gates, and through the register stages themselves. This is a total of eight propagation delays for a minimum time of $8d_{min}$. To insure that the gates 106–116 to register 2 close before the data on lines 94–104 changes, the latter path of eight propagation delays must be longer than the former path of 3 propagation delays. In this case, $3d_{max}$ must be $< 8d_{min}$ or $$\frac{3d_{max.}}{8d_{min.}} < 1$$

or $$\frac{d_{max.}}{d_{min.}} < \frac{8}{3}$$

Additional examples of element usage

Figure 7:
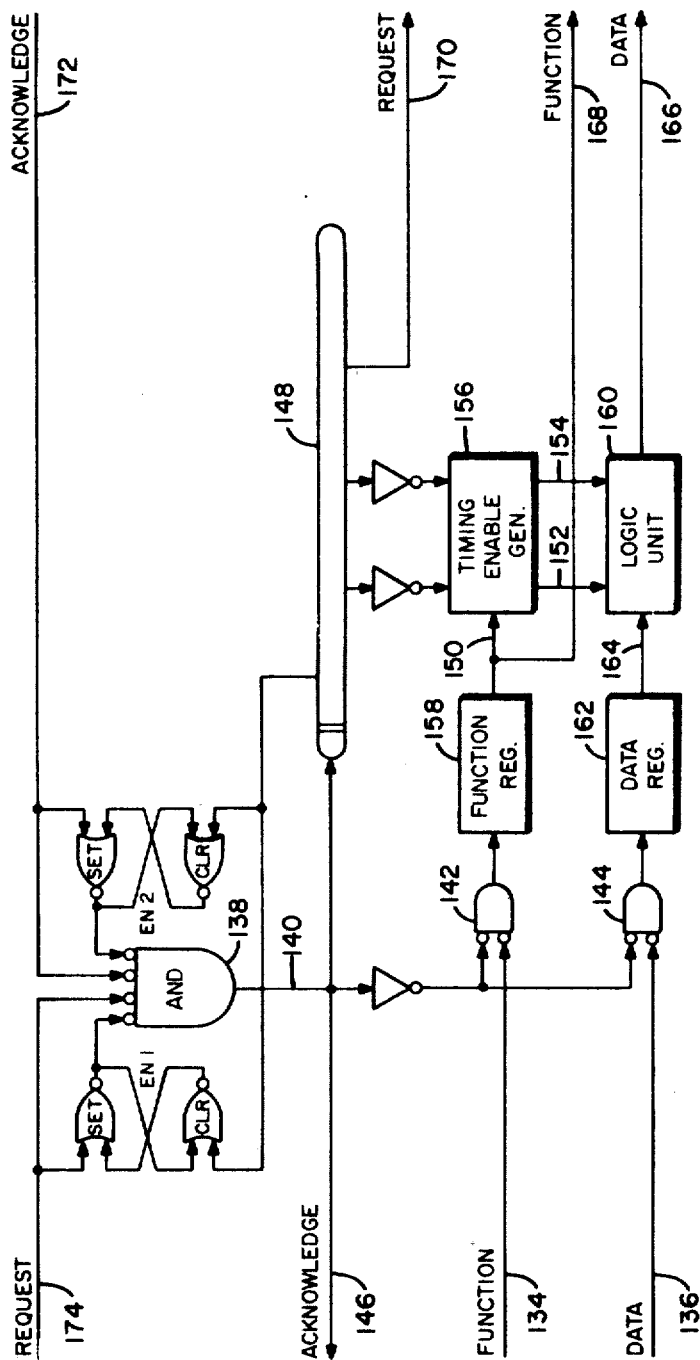
FIG. 7 shows the generic use of a basic timing element in controlling the flow of data into and out of a logic unit.
Figure 8:
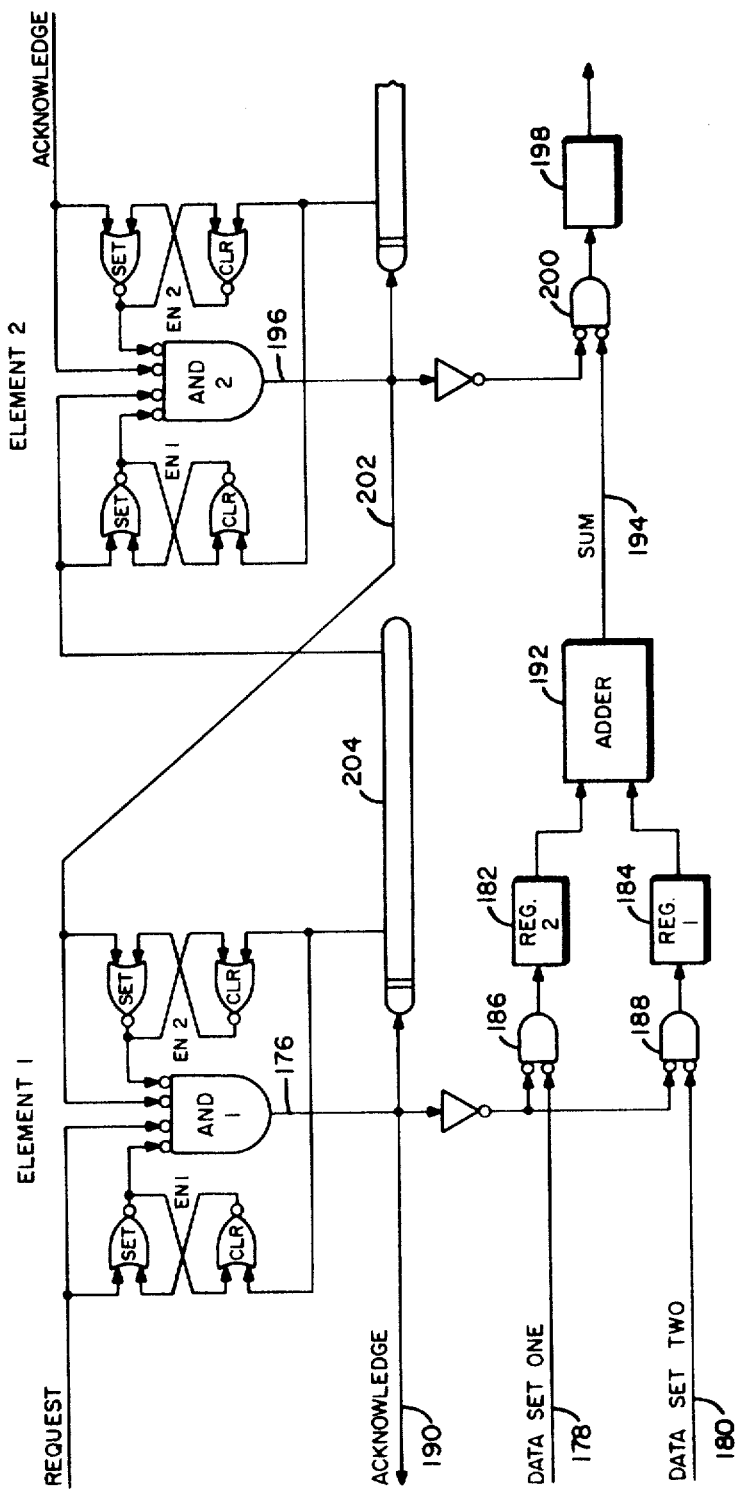
FIG. 8 discloses how the basic timing element controls the flow of data into and out of an adder.
Figure 9:
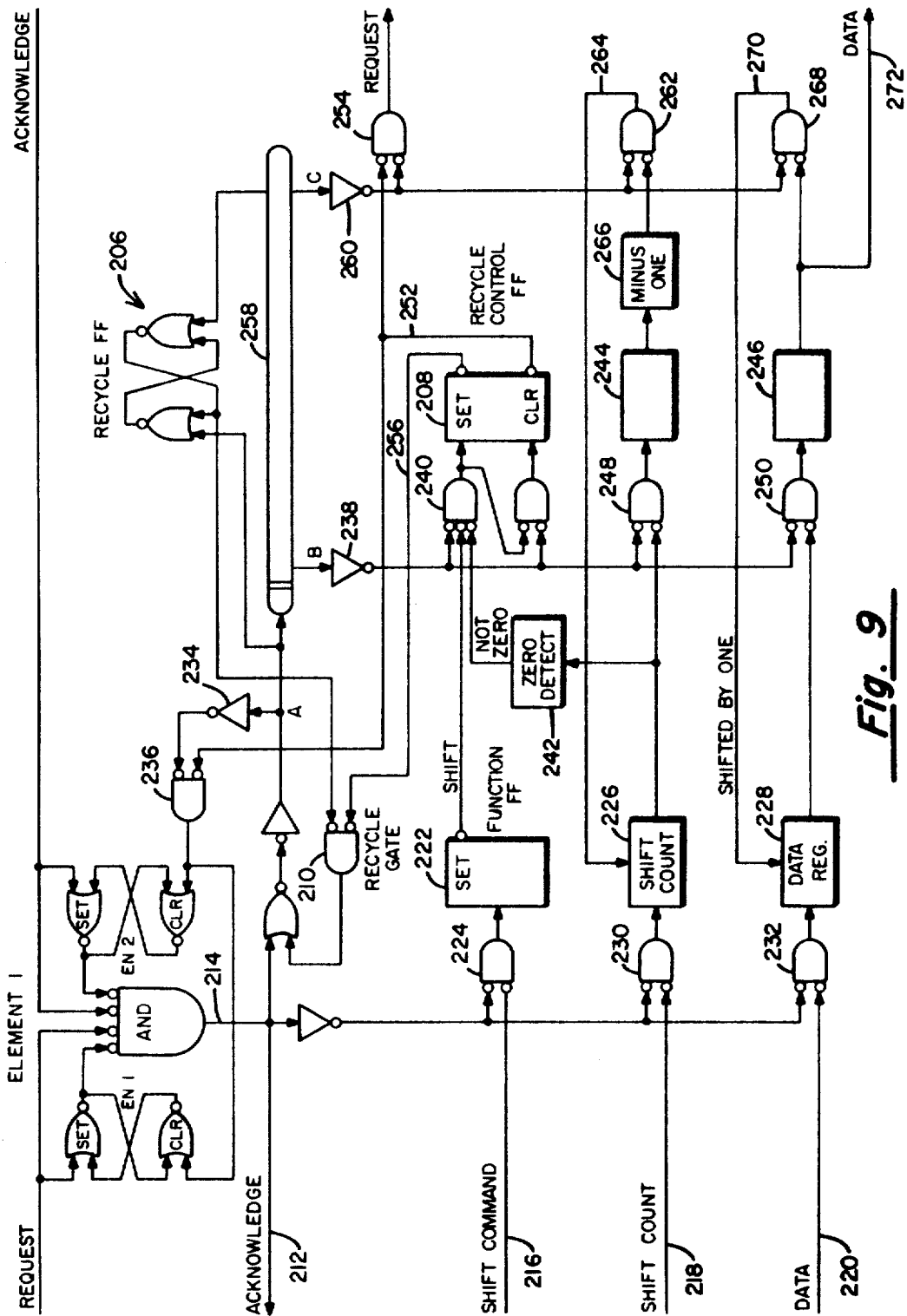
FIG. 9 discloses the basic timing element being used to control a shift operation.

In the previous example, the only function an element performs when active is gating the data into a register. The delay in an element can vary over a wide range and so can the complexity of the operations of the element. FIGURES 7, 8, and 9 present elements with longer delays which perform more complex operations.

A single timing element along with some additional logic elements is shown in FIGURE 7. The inputs to the sub-unit (sub-unit meaning the timing element and all the logic associated with it) are the "function" information on line 134 which tells the sub-unit what to do and the "data" on line 136 for the sub-unit to operate on. When AND gate 138 of the timing element is activated, the resulting pulse on line 140 gates the function information and the data into associated registers via gates 142 and 144 respectively and simultaneously acknowledges the previous element with a signal on line 146. This pulse also propagates through delay line 148 where it is tapped off at various points and used. Some of the taps off the delay line 148 go into the timing enable generator 156 where they are ANDED with information from the function register 158 on line 150. The result is timing enables on lines 152 and 154 which are fed into the logic unit 160 to perform the appropriate operations on the data which is coupled thereto from data register 162 on line 164. In the logic unit 160 there can be registers, adders, shift logic, or whatever is necessary for the operations to be performed. After the completion of the operation, the resultant data is available on the data line 166 from the logic unit. The function information is available on function output line 168. This function information on the function output line is not necessarily all the information in the function register 158 but only that information which is necessary for the remainder of the operations to be performed by the following sub-units. A tap 170 on the delay line 148 is used as a request signal to the next timing element. The next element, when it becomes active, gates the function information and data into registers and sends back an acknowledge signal on line 172 which allows the first timing element to cycle again when the next request on line 174 arrives.

FIGURE 8 shows a more specific example of an operation that can be performed. In this case, the function information is not even used. Element 1, when activated, causes AND gate 1 to produce an output signal on line 176 which gates the two sets of data on lines 178 and 180 into registers 182 and 184 respectively via gates 186 and 188 respectively and simultaneously acknowledges the previous element with a signal on line 190. The sum of the contents of the two registers is formed by adder 190 and is made available on the output line 194. A tap at the end of the delay is used to request the next element. When element 2 is active, it causes AND gate 2 to produce an output on line 196 which gates the sum from the adder output on line 194 into register 198 via gate 200 and acknowledges element 1 with a signal on line 202. The amount of delay in delay line 204 (from the input tap to the request output tap) is determined by the amount of time required by adder 192 and associated logic.

In certain computer operations such as shifting and multiplying, it is necessary to perform an operation many times. FIGURE 9 is an example of how the basic timing element can be used for a shifting operation. In this case it is necessary for the element, when requested, to cycle from one to several times (the number depending on the shift count) before transmitting the request signal to the next element. To the basic timing element, three circuits are added. They are a "recycle flip-flop 206," "recycle control flip-flop 208," and a "recycle gate 210." It is because of the recycle flip-flop 206 and recycle gate 210 that the element recycles if the "recycle control flip-flop 208" is set. When element 1 is activated, it performs the first cycle in a normal manner and sends an acknowledge to the previous element on line 212. The output of element 1 on line 214 also gates the shift command on line 216 (which in this case is a single bit of function information) into function flip-flop 222 via gate 224, and the shift count on line 218 and the data on line 220 into corresponding registers 226 and 228 respectively via gates 230 and 232 respectively. Shift count register 226 stores the count of the desired number of times the request signal is to be recycled. The pulse at point A is used to clear the enable flip-flop EN1 and EN2 through an inverter 234 and an AND gate 236 which at this time is open. The pulse at point B along the delay line is passed through inverter 238 and performs several functions. It is used to set the recycle control flip-flop 208 through control gate 240 if the function flip-flop 222 is set and thus producing a cycle command output and the contents of the shift count register 226 is not zero as detected by zero detector 242. It is also used to gate the shift count from register 226 and data from register 228 into another set of registers 244 and 246 respectively via corresponding gates 248 and 250. When the recycle control flip-flop 208 sets, it produces a signal on line 252 which closes gate 236 through which the enable flip-flops are cleared, and closes gate 254 through which the request is sent to the next element. It also produces a signal on line 256 and opens the recycle gate 210. The recycle pulse can be taken from the end of the delay line 258 and recirculated through the recycle gate 210, but if there is any deterioration of the pulse through the delay line 258, the pulse can deteriorate to an unusable form. To avoid this problem, the recycle flip-flop 206 is used to reshape the pulse each cycle. The pulse at point C along delay line 258 is passed through inverter 260 and is used to gate the shift count in register 244 through subtractor 266 (minus 1) back to the input shift count register 226 via gate 262 and line 264 and shifts the data in register 246 (shifted by one) back to the input data register 228 via gate 268 and line 270. This cycle is repeated until a shift count of zero is detected in the shift count register 226 by detector 242 which then produces a signal indicating that the request signal has been recycled the desired number of times. The next pulse from point along delay line 258 clears the recycle control flip-flop 208 thus closing the recycle gate 210 and opening the gate 254 for the request to the next element. The next pulse from point C along delay line 258 sends the request to the next element through open gate 254 while the shifted data is already available on the data output line 272.

Manual control of the elements

Figure 10:
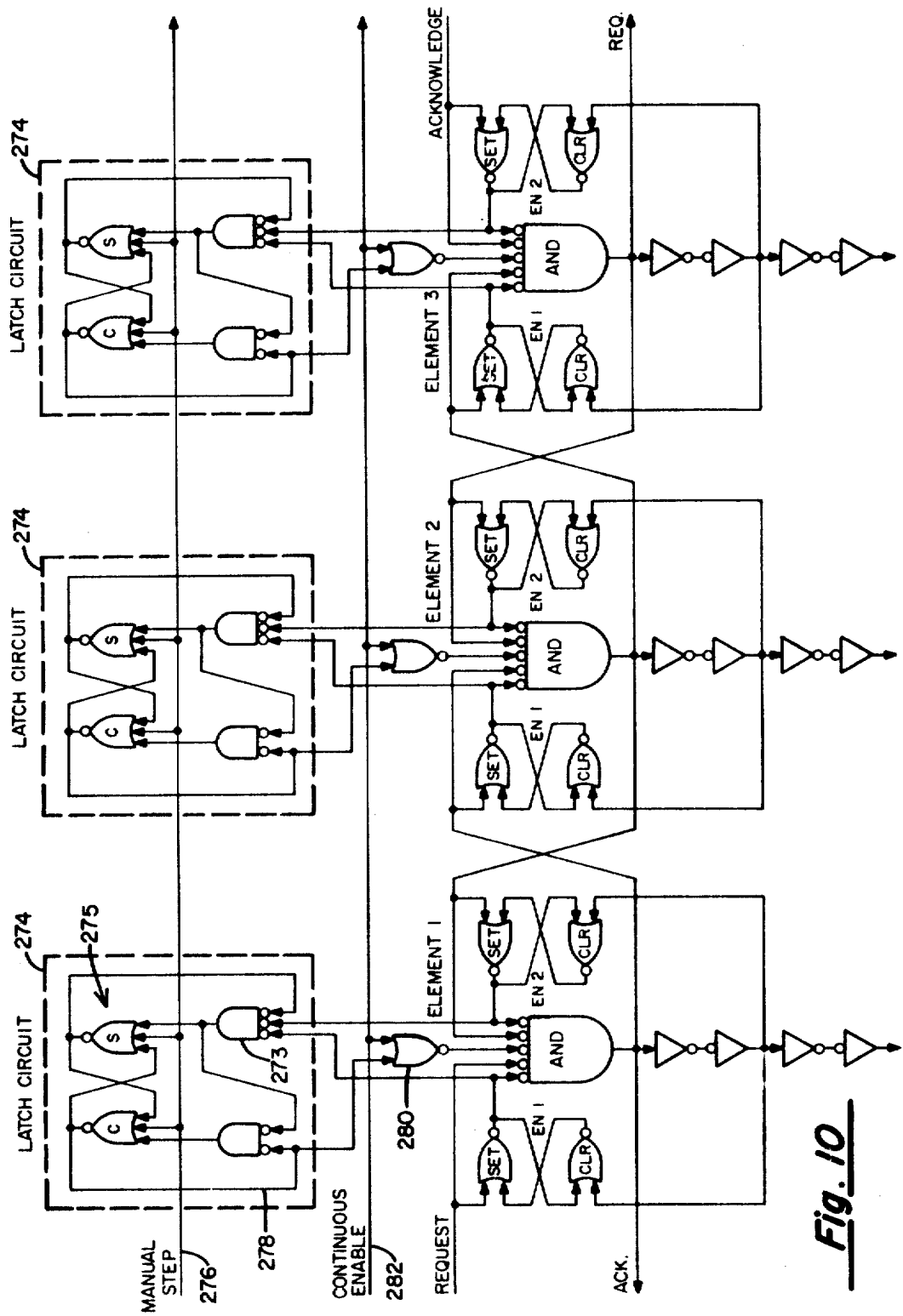
FIG. 10 discloses how the basic timing elements may be manually controlled.

If a device is made up of a large number of sub-units, it is necessary to have a certain amount of manual control over its operation to aid in the isolation of failures in the device. A scheme similar to manually stepping the clock in a clocked system is desirable. It is not convenient to step an element through its operations once it is activated, but it is possible to control manually the time when an element goes active. The problem is to manually allow the elements which are ready to go active (i.e., EN1 and EN2 are set) to cycle once. This can be accomplished by using a "latch circuit" 274 with each timing element as shown in FIGURE 10. The latch circuit has the characteristic that when it is enabled it "remembers" the condition of the input at that instant and any later change in the input conditions does not affect the condition of the latch. The latch circuit in this case has as inputs the two enable flip-flops EN1 and EN2 associated with the corresponding timing element. The enabling line 276 for the latch circuit is called "manual step." Thus, if the two enable flip-flops in element 1 are set (i.e. storing their respective request and acknowledge signals), AND gate 273 produces an output and, when the manual step line 276 goes low, the latch circuit 274 latches up with a high out from the clear side of flip-flop 275 on line 278. This high output is inverted through an OR circuit 280 (assume for the moment that the other input to this OR on line 282 is low) which in turn feeds the AND gate of timing element 1. With the latch circuit in this state, timing element 1 is enabled. If either of the two enable flip-flops EN1 or EN2 of element 1 is clear when the manual step line 276 goes low, the latch circuit 274 latches up with a low out from the clear side on line 278. This low output is inverted through the OR circuit 280 which inhibits the AND gate of element 1 even though at a later time both enable flip-flops are set.

The other input to the OR circuit 280 on line 282 is called the "continuous enable" line. When this line is high, the elements are all enabled through OR gate 280 in spite of the condition of the latch circuits 274. When the device is running, it must not be stopped by either of these two control lines 276 or 282 because the AND gates must not be disabled at any random time. Therefore, once the continuous enable line 282 goes high, it must not return to the low condition until all elements to which it is coupled are known to be inactive.

When all elements are inactive, the continuous enable line 282 can go low and the manual step function can be used. A scheme for stopping the device will be discussed later. Although the above discussion related only to element 1, it is obvious that the other elements shown in FIG. 10 operate in a like manner.

Branching

Figure 11:
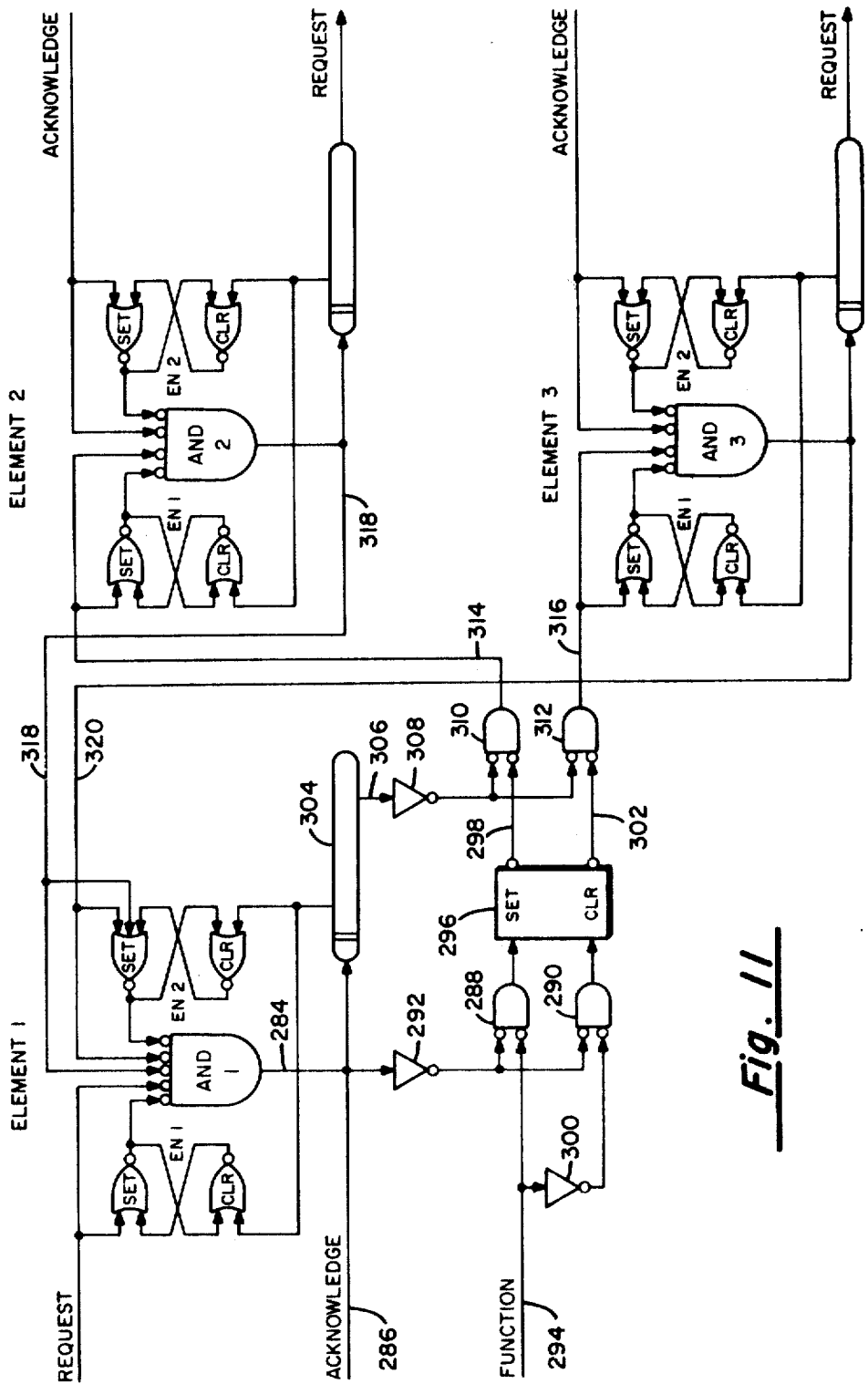
FIG. 11 discloses how the basic timing element output may be coupled to only one of several available receiving units.

To design a complete system of timing elements, it is not only necessary to be able to connect these elements in series, as is done up to this point, but also to be able to branch from one element into several and to merge from several elements into one. FIGURES 11 through 15 present different schemes for branching and merging. In FIGURE 11, a scheme is presented for branching from one element to either one of two succeeding elements, but not both. This can be extended to branch to one of several succeeding elements but for simplicity only two succeeding elements are shown. Because there is only one EN2 flip-flop in element 1, the branch can take only one of two paths. When element 1 cycles, it produces an output on line 284 which not only acknowledges the previous element on line 286 but also opens gates 288 and 290 through inverter 292. The function signal on line 294 denotes which branch is to be taken. If it is a low signal, it passes through gate 288 to set flip-flop 296 which produces an output on line 298. If it is a high signal, it passes through inverter 300 and gate 290 to clear flip-flop 296 which produces an output on line 302.

The output pulse from delay line 304 on line 306 is a request signal which passes through inverter 308 to gates 310 and 312. There must be one of such gates 310 or 312 for each succeeding element. If the function signal on line 294 is low, flip-flop 296 will be set and will produce an output on line 298 as stated previously. This signal will open or enable gate 310 to allow the request signal to be coupled to element 2 in the first path via line 314. If flip-flop 296 is cleared by the function signal, it produces an output on line 302 which enables gate 312 to allow the request signal to be coupled to element 3 in the second path via line 316. Obviously separate function signals could be used to enable individual ones of a plurality of gates such as gates 310 and 312. When the requested element becomes active, it acknowledges element 1 by clearing EN2 flip-flop of element 1 via either line 318 or 320.

Figure 12:
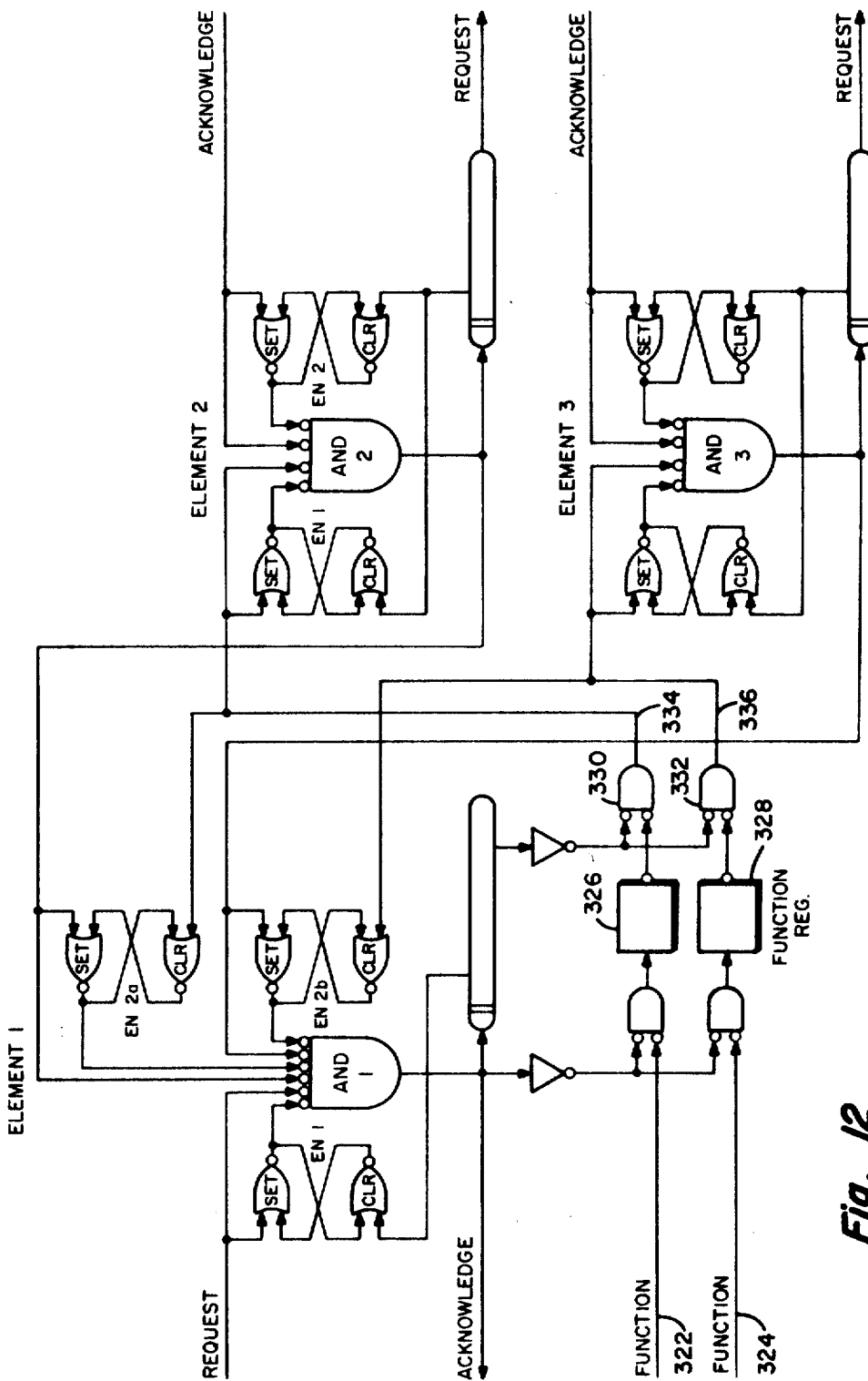
FIG. 12 discloses how the basic timing element output may be coupled to one or more of several available receiving units.

In FIGURE 12, a scheme where the branch can take both paths simultaneously is shown. In this case, there are two EN2 flip-flops 2a and 2b, in element 1, one for each succeeding element. There are also two input function lines 322 and 324 and two function registers 326 and 328 each of which may simultaneously store a signal requesting a respective one of the branches. If such occurs, gates 330 and 332 will both produce request via lines 334 and 336 respectively to element 2 and 3 respectively. When element 1 has requested elements 2 and 3, both requested elements must acknowledge element 1 before element 1 can cycle again. This means that both EN2 flip-flops in element 1 must be cleared by the output of the associated requested element 2, 3 or both. Which way the branching goes is determined by the function information available on input lines 322 and 324.

Merging

Figure 13:
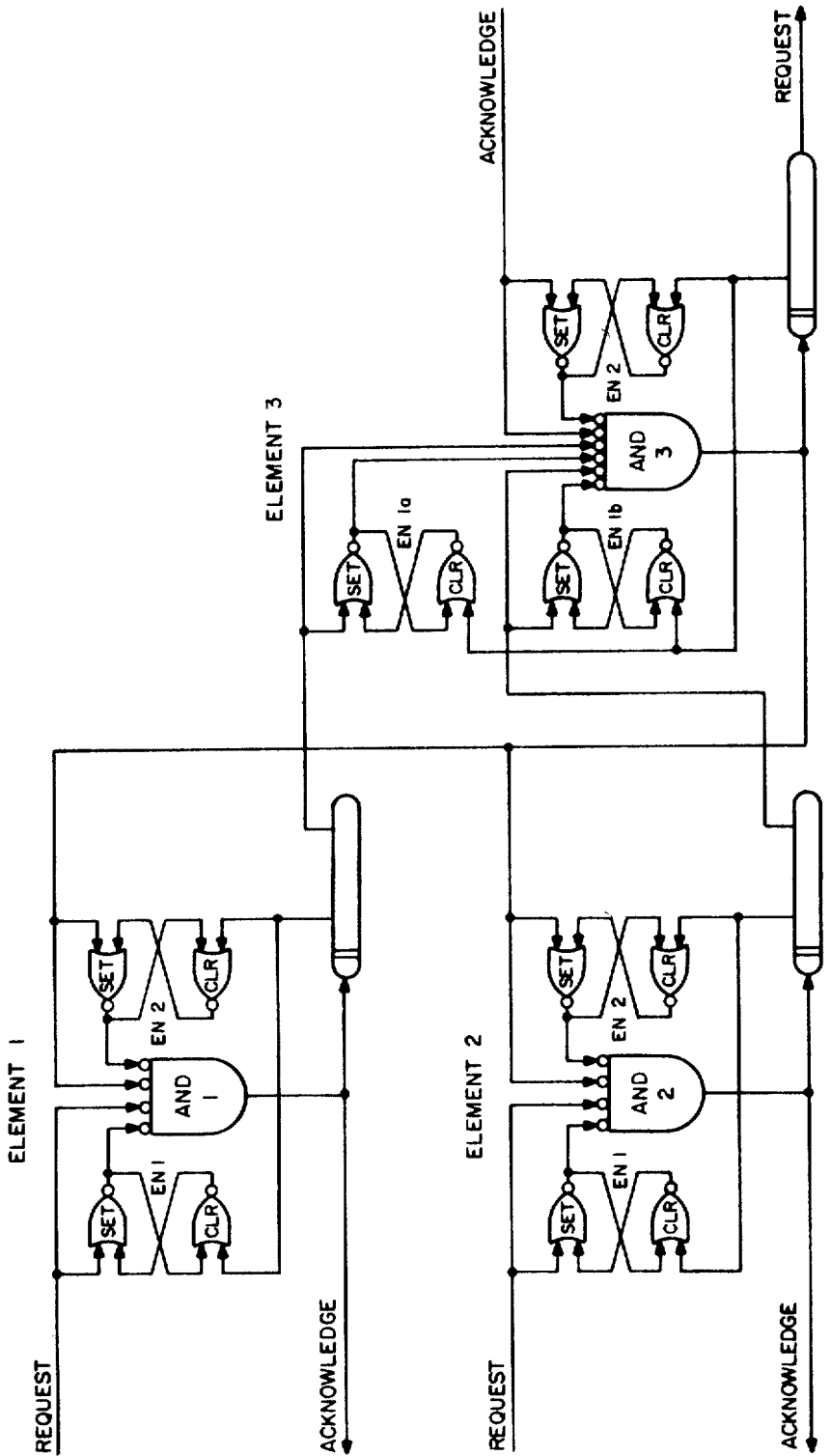
FIG. 13 discloses how the basic timing element can receive inputs from several adjacent timing elements.

FIGURE 13 is a merging scheme in which both element 1 and element 2 must cycle and request element 3 before element 3 can cycle. In this scheme element 3 has two EN1 flip-flops and both must be set before element 3 can cycle.

Figure 14:
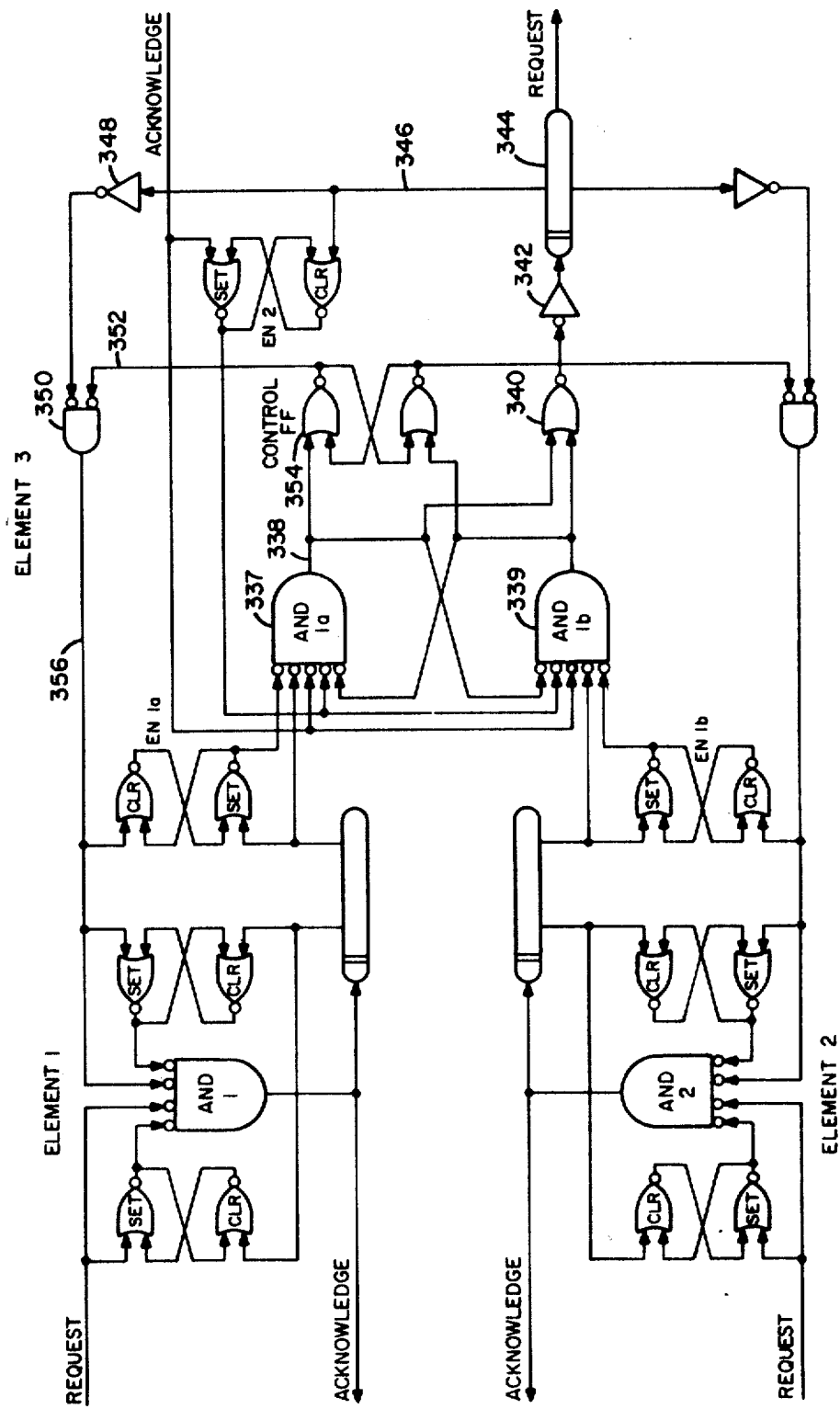
FIG. 14 discloses how the basic timing element can receive inputs from several adjacent timing elements and select only one of them.

A second merging scheme is presented in FIGURE 14. In this scheme, element 3 has two EN1 flip-flops 1a and 1b and also has two AND gates 337 and 339. The result is that elements 1 and 2 can request element 3 at any time either individually or simultaneously. When requested, by element 1, 2 or both, element 3 cycles, acknowledging whichever element made the request first. In element 3, the two AND gates 337 and 339 are transfer gates which are cross connected to form a flip-flop. When both EN1 flip-flops are clear, the output of both AND's is low.

For example, if EN1a is now set by element 1 (and if EN2 is set), AND gate 337 is activated and its output goes high on line 338. This high output is connected back to the input of AND gate 339, preventing AND gate 339 from being activated even if EN1b is set by element 2. The output of AND gate 337 feeds on OR circuit 340, which in turn feeds the delay 344 via inverter 342 and also sets a "control flip-flop" OR gate 354 to remember that element 3 is cycling at the request of element 1. From a tap along the delay line 344, a signal is taken on line 346 to clear the EN2 flip-flop of element 3. Also, this signal goes through an acknowledge gate 350 (via inverter 348) which is opened by the control flip-flop OR gate 354 and clears EN1a and acknowledges element 1. If EN1b is set before EN1a, the other side works in a similar manner.

If both elements 1 and 2 simultaneously request element 3, and as a result both AND gates 337 and 339 are simultaneously activated, one of the AND gates is immediately deactivated due to their cross connection as a flip-flop. The output of one of the AND gates remains high and element 3 accepts the request of the associated element. The output of the other AND gate drops back low in one inverter delay time. Since it is possible to get a momentary high output from one AND gate, it is not possible to use the AND gate outputs to acknoledge the requesting element. This is why the acknowledge is sent to the requesting element at a later time when the control flip-flop is in the proper state. The control flip-flop is stable only after the cross connected AND gates have settled since this flip-flop is fed by both AND gates. After the AND gates are closed, however, the control flip-flop "remembers" which input is selected.

This merging scheme can be extended to merge more than two elements but the number of inputs to the AND gates can get quite high. This is because the output of each AND must feed the input of all other AND's. The recycle capability can be implemented by adding a recycle control flip-flop and a recycle flip-flop as shown in FIGURE 9.

The manual step capability, shown in FIGURE 10, can be used by the branch and merge elements. In the case of element 3, in FIGURE 14, one latch circuit is necessary and the inputs to the latch circuit AND gate are EN2 and EN1a or EN1b. That is, if EN2 is set and either of the EN1 flip-flops is set, the latch flip-flop is set enabling the timing element. In element 3 of FIGURE 13, the condition to set the latch is the setting of flip-flops EN1a and EN1b and EN2. All three enable flip-flops must be set for the latch flip-flop to set since this is the condition necessary for the element to cycle. If manual control is added to an element which has recycle capability, such as in FIGURE 9, it can be done in such a way that one step is either one shift cycle or the complete shift sequence. If a latch circuit is added to only the controlling AND gate, one step causes the complete shifting sequence to run. If a latch circuit is also added to the recycle gate, one step causes only one shift cycle.

Stopping

A device can be stopped by locking up or disabling any one of the elements in the device. Again using the analogy of the bucket brigade, it is obvious that if any one man stops, the activity of the entire line eventually stops. All the men to his left are holding buckets and those to his right have none. The same is true in a device made up of many sub-units except that the device very likely is more complex than a bucket brigade in that there are likely several paths for a signal to take through the device. Disabling any element eventually stops the device but there are some elements which, if disabled, cause the device to stop sooner than others. For example, if the device is a digital computer, the logical element to disable is that one which accepts instruction words from memory.

Figure 15:
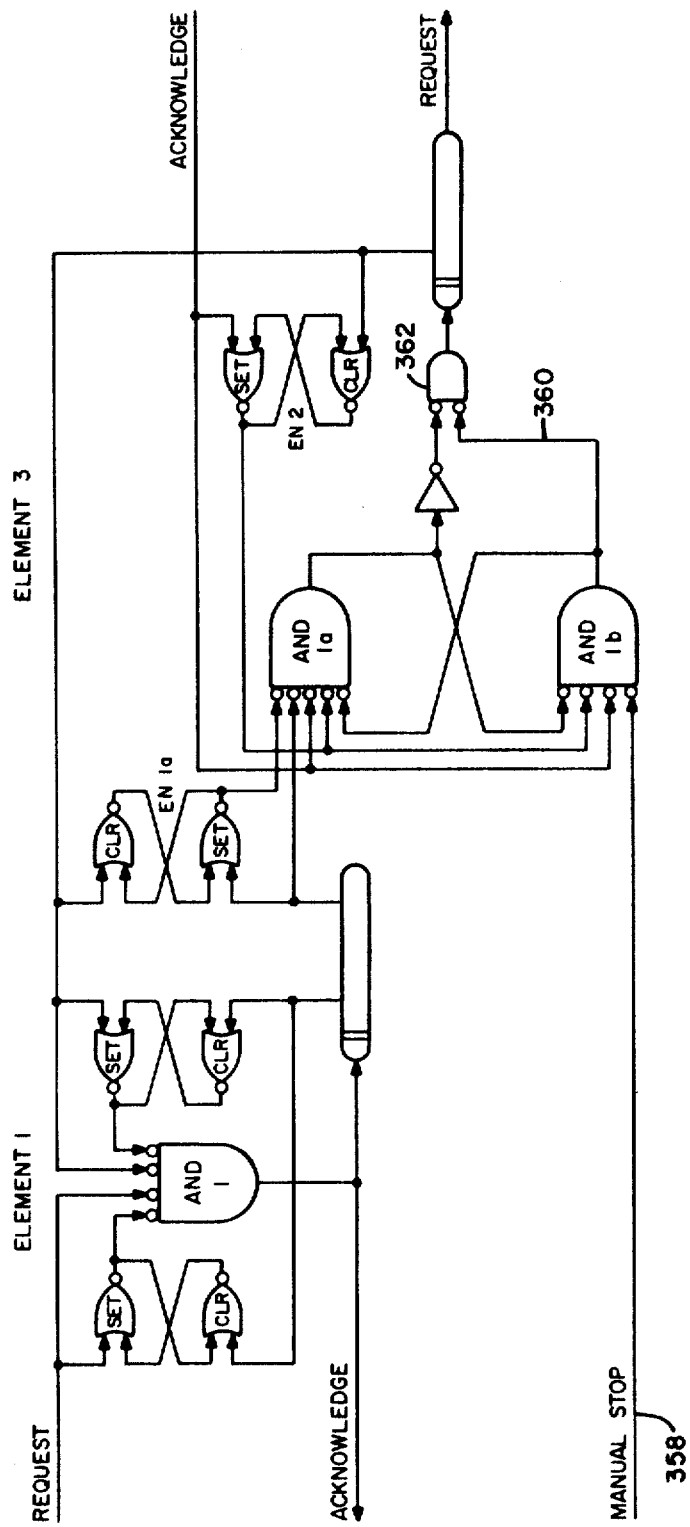
FIG. 15 apparatus for manually disabling a basic timing element is disclosed.

In FIGURE 15 a scheme for manually disabling an element is presented. It is similar to the merging scheme presented in FIGURE 14, except that one of the merged inputs is a manual stop on line 358. There are two AND gates and they are cross connected to form a flip-flop. In the scheme of FIGURE 14, the outputs of the two AND gates fed an OR circuit 340 which in turn fed the delay line 344. This is because the element has to cycle at the request of either element 1 or element 2. In FIGURE 15, however, element 3 cycles only at the request of element 1 and thus the "control flip-flop" is also eliminated.

Element 3 is disabled by placing a low on the "manual stop" line 358. This low input is treated as a request from another element. If it arrives at AND gate 1b before a request from element 1 arrives at AND gate 1a, the element is stopped. If a request from element 1 and a manual stop signal on line 358 arrive at their respecticve AND gate simultaneously, the flip-flop action of the cross connected AND gates chooses between the two inputs. It was mentioned in the discussion of FIGURE 14 that in this case it is possible to get a momentary high out of one of the AND gates (the one that lost the race). In the scheme of FIGURE 15, in order to prevent a spike at the output of AND gate 1a from propagating through the delay, the output of AND gate 1b on line 360 is used to close the AND gate 362 into the delay.

CONCLUSION

This paper presents the fundamentals of an approach whereby a digital device can be designed as a system of many nonsynchronous sub-units. For a given device, the more sub-units it is divided into, the simpler is each sub-unit. However, more sub-units means a more complex system. As the system becomes more complex, it becomes more difficult to predict the overall performance of the device. However, this problem can be overcome through simulation.

The problem of debugging or checkout of such a device can be broken up into an orderly sequence of events. Individual sub-units are tested. Then, as the sub-units are assembled into the system, each interface between sub-units is checked. Then, the performance of combinations of sub-units is checked and finally the entire system.

The ratio of maximum to minimum propagation delay of a given circuit design can be a problem if it becomes too large. However, this can be a problem even in clocked circuits. A ratio of 2 to 1 including all the effects of fan-in, fan-out and wire length can be tolerated and is reasonably obtained with the present state-of-the-art in integrated circuits.

I claim:

1. A system for asynchronously controlling the transfer of data from a first register to at least one of a plurality of parallel succeeding register, said system comprising:

(a) a basic timing element associated with each of said registers, each of said elements comprising:
  (1) first storage means for receiving and storing a request signal from the element associated with the preceding register,
  (2) second storage means for receiving and storing an acknowledge signal from at least one element associated with the parallel succeeding registers, and
  (3) third means having its input coupled to said first and second storage means and producing an output signal which enables transfer of data from said preceding register to at least one of said succeeding registers, and
(b) means for selectively coupling said output of the third means of the element associated with said first register to at least one of said elements associated with said parallel succeeding registers as a request signal.

2. A system as in claim 1 wherein said means for coupling said request signal to at least one of said elements associated with said parallel succeeding registers comprises:
  (a) a plurality of gates equal in number to the parallel succeeding registers, each of said gates having one input coupled to the output of said third means in said element associated with said first register for receiving said request signal,
  (b) means coupling the output of each of said gates to a respective one of said first storage means and said third means in a corresponding one of said like plurality of parallel succeeding elements, and
  (c) means coupled to each of said plurality of gates for enabling at least one of said gates to pass said request signal to said first storage means and said third means of the corresponding succeeding element.

3. A system as in claim 2 further including:
  (a) means for coupling said acknowledge signal from each succeeding parallel element as an input to said second storage means and said third means of said first element whereby any selected one of said succeeding elements may acknowledge said first element.

4. A system as in claim 2 further including:
  (a) a plurality of additional said second storage means associated with said first element, the total number of second storage means being equal in number to said succeeding parallel registers and each receiving an acknowledge signal from a corresponding one of said succeeding parallel registers whereby all of said succeeding elements may be simultaneously selected and acknowledge said first element.

5. A system for asynchronously controlling the transfer of data from at least one of a plurality of parallel registers to a succeeding register, said system comprising:
  (a) a basic timing element associated with each of said registers, each of said elements comprising:
    (1) a first storage means for receiving a request signal from the element associated with at least a single preceding register,
    (2) second storage means for receiving and storing an acknowledge signal from the element associated with the succeeding register, and
    (3) third means having its input coupled to said first and second storage means and producing an output signal which enables transfer of data from at least one of said preceding registers to a succeeding register, and
  (b) means for coupling said output of said third means of the element associated with at least one of said parallel registers to said element associated with said succeeding register as a request signal.

6. A system as in claim 5 wherein said means for coupling said request signal from at least one of said elements associated with said parallel registers to said element associated with said succeeding register comprises:
  (a) a plurality of additional first storage means one less in number than said parallel registers and each having its output coupled to said third means of the element associated with said succeeding register, and
  (b) means for coupling said request signal from said third means in each of said elements associated with respective one of said parallel registers to a corresponding one of said first storage means in said element associated with said succeeding register whereby said element associated with said succeeding register will produce an output signal only if request signals from all parallel elements are received.

7. A system as in claim 5 wherein:
  (a) the number of said parallel registers is two, and
  (b) said first storage means comprises:
    (1) first and second bistable storage devices each of which has its input coupled to a respective one of said parallel elements and its output coupled to said third means of said element associated with said succeeding register.

8. A system as in claim 7 wherein said third means comprises:
  (a) first and second transfer gates each having its output coupled to the input of the other whereby the first transfer gate enabled provides an inhibit signal to the other, and
  (b) means coupling the output of each of said first and second bistable storage devices to a corresponding one of said first and second transfer gates whereby only the first transfer gate receiving an output from said bistable storage devices is enabled.

9. A system as in claim 8 further including:
  (a) first and second acknowledge gates each having one input coupled to the output of both said first and second transfer gates,
  (b) a flip-flop having the input of one side coupled to the output of one of said transfer gates and the input of the other side coupled to the output of the other of said transfer gates, said flip-flop producing first and second outputs, and
  (c) means connecting each of said first and second outputs of said flip-flop to a corresponding one of said acknowledge gates as an input whereby only the acknowledge gate coupled to the element first sending a request signal is enabled to pass an acknowledge signal.

References Cited

UNITED STATES PATENTS

| | | | |
|---|---|---|---|
| 3,384,761 | 5/1968 | Olson et al. | 328—42 |
| 3,371,221 | 2/1968 | Onuma et al. | 307—221 |
| 3,166,715 | 1/1965 | Cogar | 307—221 |
| 2,840,705 | 6/1958 | Scully | 340—172.5 |

GARETH D. SHAW, Primary Examiner

U.S. Cl. X.R.

307—221; 328—37, 42